United States Patent [19]

Fabius

[11] Patent Number: 5,004,203
[45] Date of Patent: Apr. 2, 1991

[54] SUPPORTING ARM

[76] Inventor: Albert Fabius, Ingelandenweg 1, 1069 WE Amsterdam, Netherlands

[21] Appl. No.: 457,311

[22] Filed: Dec. 26, 1989

[30] Foreign Application Priority Data

Dec. 23, 1988 [NL] Netherlands .......................... 8803162

[51] Int. Cl.$^5$ ............................................... E04G 3/00
[52] U.S. Cl. ...................................... 248/285; 384/53; 403/109
[58] Field of Search ............ 248/285, 286, 287, 295.1, 248/298, 125; 403/109; 384/35, 53

[56] References Cited

U.S. PATENT DOCUMENTS

| | | | |
|---|---|---|---|
| 2,881,031 | 4/1959 | Comfort | 384/53 X |
| 3,118,066 | 1/1964 | Thomas et al. | |
| 3,244,883 | 4/1966 | Labus et al. | |
| 3,519,291 | 7/1970 | Scott | 403/109 X |
| 3,887,155 | 6/1975 | Bertalot | 384/53 X |
| 3,887,247 | 6/1975 | Graae et al. | 384/53 |
| 4,239,169 | 12/1980 | DeSantis | 403/109 X |
| 4,376,397 | 3/1983 | Newby et al. | 403/109 X |
| 4,555,148 | 11/1985 | de Willigen et al. | 384/53 X |

FOREIGN PATENT DOCUMENTS

| | | |
|---|---|---|
| 2040687 | 2/1971 | Fed. Rep. of Germany. |
| 1945134 | 4/1971 | Fed. Rep. of Germany. |
| 2088721 | 1/1972 | France. |
| 2210237 | 7/1974 | France. |
| 436646 | 11/1967 | Switzerland. |
| 784533 | 10/1957 | United Kingdom. |

OTHER PUBLICATIONS

"Tragfahigkeit von Teleskopen", *Fordern und Haben*, vol. 22, No. 3, 1972, by W. Huber, pp. 125–127.

*Primary Examiner*—Ramon O. Ramirez
*Attorney, Agent, or Firm*—Young & Thompson

[57] ABSTRACT

A supporting arm consists of telescoping sections (1-4, 17-19) which are mutually supported by roller bearings such as needle bearings (8) or ball bearings (25). The cross sectional shape of the sections (1-4, 17-19) is polygonal, so as to provide a high bending and torsional stiffness. By providing grooves in the supporting faces (10, 23, 24) of the sections, the strength characteristics as well as the behavior during telescoping under high loads may be enhanced.

15 Claims, 3 Drawing Sheets

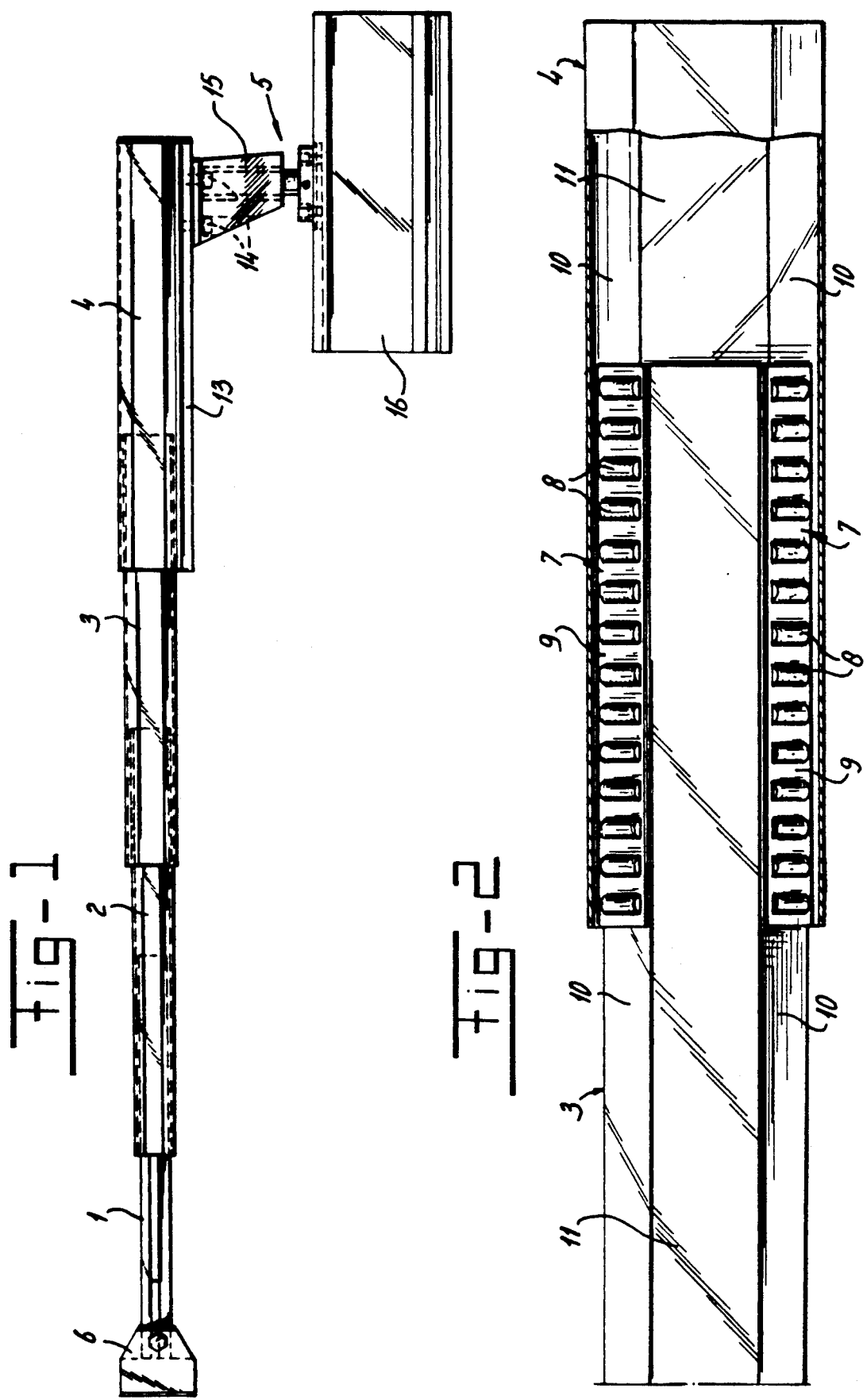

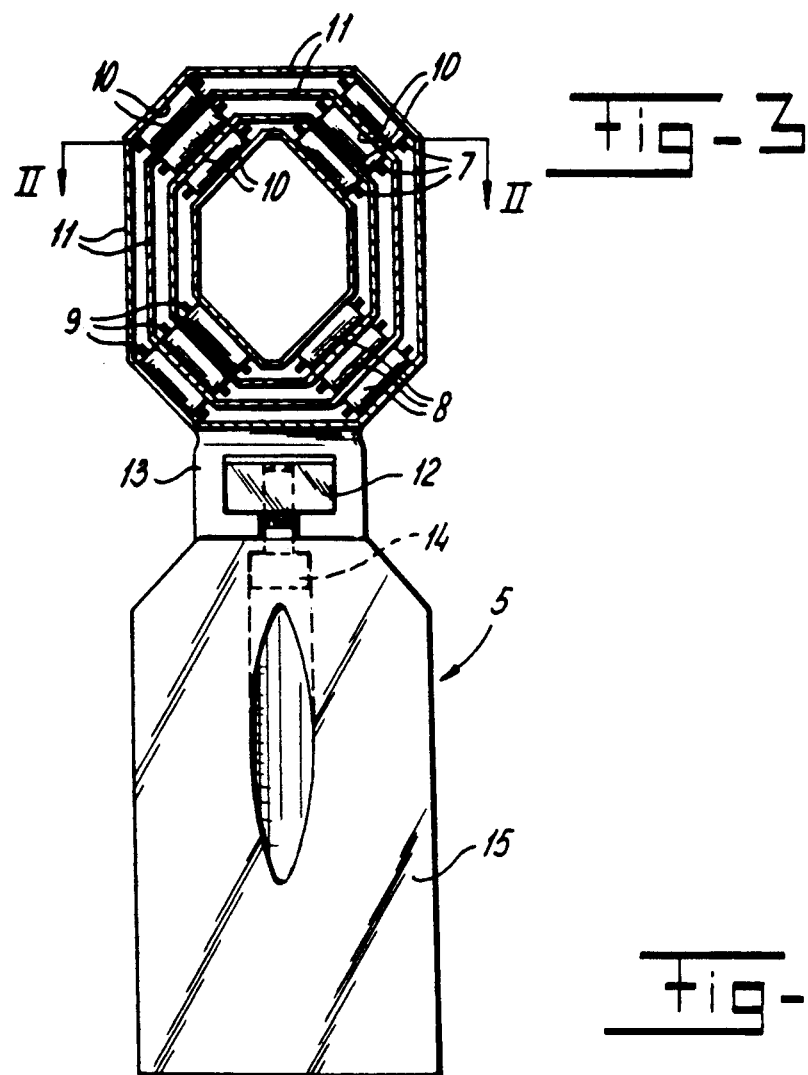
Fig-3
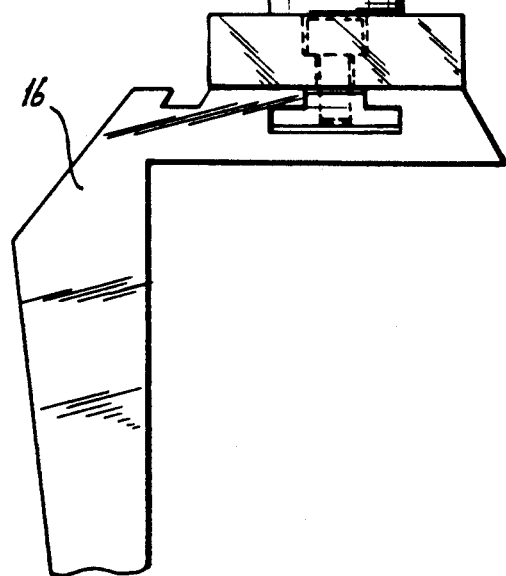
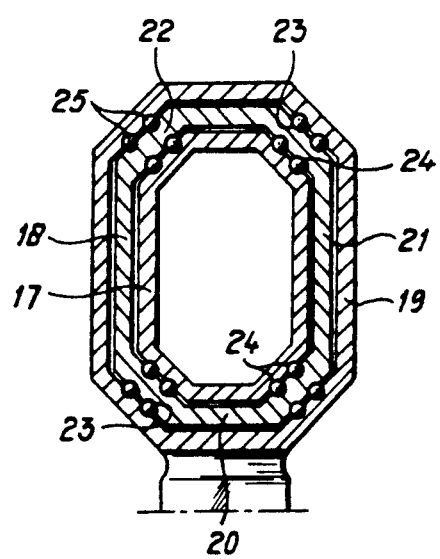
Fig-4

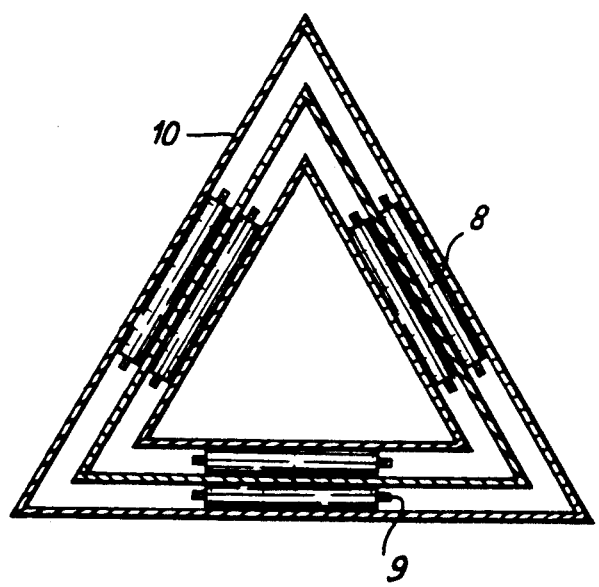

SUPPORTING ARM

The present invention deals with a supporting arm provided with telescoping members for supporting a device such as a terminal in an essentially horizontal displaceable manner.

Such a supporting arm is known from EP-A-172320. This known supporting arm consists of flat, square tube material in the inside of which a plate is slideable by means of roller bearings. At the end of the plate a terminal may be provided, rotatable round a vertical axis.

This supporting arm has several disadvantages. For instance, the plate like member is less suitable for carrying loads which are not exerted in its plane, such as torsional forces and horizontal bending forces. These kind of forces may occur for instance in cases where the terminal is being operated from the side of the arm, or where the terminal is positioned outside the middle of the arm. As a consequence of the insufficiently large stiffness of the plate like member with respect to these loads, large deformations occur, which of course is very undesirable when using the keyboard of a terminal. Furthermore the supporting arm with the supported terminal may start swinging under the influence of the thrustloads which are exerted when using the keyboard, which in any case should be prevented. The behaviour of the known supporting arm might be improved by selecting a suitable thickness for the plate like member. This however leads to an unacceptably high weight.

The aim of the invention is therefore to provide a supporting arm of the kind mentioned above, which has a sufficiently high bending and torsional stiffness, without causing a high weight.

This aim is achieved in that the telescoping members consist of sections with a closed irregular polygonal cross section. Because all telescoping members according to the invention are carried out as hollow, closed sections, the stiffness of the supporting arm with respect to bending and torsional loads is sufficiently high, such that the terminal may be used in a suitable manner, without causing large defections or vibrations. The shape of the cross section of the sections may be selected such that a low weight may be accompanied with the desired stiffnesses. Also, the position of the pairs of supporting faces which cooperate with each other via the bearings, may be selected such that the bearing load caused by the forces exerted externally of the supporting arm, is as advantageous as possible.

The known supporting arm is carried out such that the telescoping members cooperate with each other by means of bearings, each of which acts on a pair of supporting faces belonging to different sections.

According to the invention, in this case all supporting faces may be formed by internal and/or external section faces. In this way a very compact lay out may be obtained, as the differences in the dimensions of the cross sections of the sections may be kept relatively restricted. Therefore it is possible to insert a larger number of sections in each other, for instance four, without however the outermost section becoming too thick or the innermost section becoming too thin. In this case the supporting arm is collapsible and extendable over a relatively large distance, which enhances the user comfort.

According to a preferred embodiment of the invention, the supporting faces are provided with bearing grooves which run in longitudinal direction and which are formed according to the bearings, such that the bearings are not displaceable transverse to the supporting arm. This embodiment is especially advantageous in that is provides a greater strength and stiffness with respect to torsional loads.

According to a first possiblity the bearings are needle bearings and the profiles consist of walls which, in circumferential direction, run at an angle in the same direction with respect to each other.

In this respect it is mentioned that form NL-A-7316496 a vertical supporting mechanism is known provided with telescoping tubes and needle bearings. These needle bearings are prestressed by a spring, such that the distance between the walls of the tubes is greater than the needle diameter. Such a supporting mechanism is not suitable for horizontally supporting a terminal in a stable way, because the prestressing springs might yield under transverse loads.

According to a second possibility, the bearings may be ball bearings, and the supporting faces may be provided with grooves which in cross section are partly circular. In this case preferably in each supporting face at least two parallel grooves are provided, such that the pairs of supporting faces enclose at least two parallel series of balls. When the walls are provided with one groove, in the case of external torsional loads the ball bearings are loaded with forces having a component parallel to the wall in which the groove is located. It is clear that the ball bearings are able to carry these loads in a suitable way, when the grooves in the walls are deep enough such that the ball bearings are supported over a large part. In the second case the grooves may be kept more superficial as the ball bearings in this embodiment are mainly loaded in a direction perpendicular to the walls, and not parallel to the walls.

According to the invention each section may have internally three supporting faces and/or externally three supporting faces. In this embodiment a trianguler support is provided between the profiles, which offers a good stability. Also, each profile may have internally four supporting faces and/or externally four supporting faces. Preferably in that case the supporting arm is carried out such that the profiles have an octagonal section, and consist in circumerentional direction of alternately walls with a supporting face and walls without a supporting face, whereby opposing walls without supporting face are parallel. By dimensioning the section walls in a suitable way, almost every desired cross sectional form may be selected for the supporting arm.

In order to avoid unnecessary loadings on the bearings, preferably the oppositely situated pairs of walls with a supporting face are parallel to each other. In the case wherein one pair of walls without supporting face runs horizontally, and one pair runs vertically, a good bending stiffness in vertical and in horizontal direction may be obtained.

In this case, the walls without supporting faces are situated relatively far towards the outside with respect to the needle bearings. Therefore, the cross sections of the sections have a relatively high bending stiffness.

In this respect the supporting arm may be carried out also such that the section with the smallest cross sectional-surface consists in circumferential direction of alternately two walls with a supporting face and one wall without supporting face, whereby the pair of opposing walls without supporting face runs vertically. This embodiment is especially suitable for large vertical loads, because this profile is relatively high in a vertical direction.

Furthermore the supporting arm may be carried out such that all internal and/or external faces of the sections are supporting faces which are acted upon by roller bearings. The advantage of such an embodiment lies in the face that relatively high loads may be displaced in an easy way when telescoping the supporting arm.

In order to fix the supporting arm to a desk surface or a stand the outermost section may be externally provided with a longitudinal groove with undercut cross section which is suitable for receiving a T shaped fixing member. It has already been mentioned that the supporting arm according to the invention may be carried out with more than two sections, for instance four. In that case the supporting arm may be collapsed and extended over a relatively large range.

In the case of applications in which not the whole range will be used, the section with the smallest cross sectional area may be lockable with respect to the next surrounding section, when collapsed completely therein.

In the following, the invention will be explained with respect to three embodiments shown in the figures.

FIG. 1 shows the supporting arm according to the invention in an extended position.

FIG. 2 shows part of a transverse view on enlarged scale according to II—II in FIG. 3, of a first embodiment.

FIG. 3 shows a cross section through the supporting arm in collapsed position.

FIG. 4 shows a cross section through the supporting arm in collapsed position, of a second embodiment.

FIG. 5 shows a cross section through the supporting arm in collapsed position, of a third embodiment.

The supporting arm depicted in FIGS. 1 consists of four telescoping parts 1, 2, 3 and 4, as well as a fixation foot 5. At its free end the supporting arm is provided with a head 6, which is suitable for supporting a table, for instance for a terminal.

As shown in FIGS. 2 and 3 of the first embodiment, the telescoping parts are supported with respect to each other by means of needle bearings 7. These needle bearings 7 consist of needles 8 embedded in a bed 9. In this embodiment of the supporting arm these needles may roll over the sloping walls 10 which thus provide supporting faces of the telescoping parts 1 to 4. These telescoping parts have an octagonal cross section, while between the walls 10 which thus provide supporting faces there are walls 11.

The needle bearings 7 are positioned in the four corners of the section. This is advantageous in that the walls 11 of neighbouring sections may be situated close to each other, leading to favourable bending and torsional properties. As depicted in FIGS. 1 and 3 the fixation foot 5 has a fixation member 12, which is receivable between two L-shaped strips 13 which are directed towards each other at the underside of telescoping part 4. The fixation member 12 is clamped in the undercut groove formed by the two strips 13, by means of bolts 14, the head of which is received in stud 15 of the fixation foot 5. The telescoping part 4 may at any suitable position in its longitudinal direction be clamped upon the fixation foot 5.

Also the fixation foot 5 is provided with a clamp 16, the details of which have been omitted, with the help of which it may be fixed at the edge of a desk or a working table.

As a matter of fact the roller bearings might also be supported by the walls 11. Furthermore it is possible to position the roller bearings alternately on the walls 10, 11, in the direction from the most inward to the most outward section.

In FIGS. 4, a second embodiment of the supporting arm according to the invention is shown. In this embodiment, three telescoping parts 17, 18 and 19 are incorporated although a larger or smaller number of telescoping parts could be provided. All telescoping parts 17, 18, 19, have an octagonal form, with horizontal walls 20 and vertical walls 21. Furthermore, the sections 17, 18, 19, having sloping walls 22. In these sloping walls, longitudinal grooves 23 are provided on the outside, and/or longitudinal grooves 24 are provided on the inside. In the longitudinal grooves 23, 24 ball bearings 25 are incorporated without play. This embodiment offers a supporting arm with a very high bending and torsional stiffness. The dimensions of the innermost section 17 are relatively large compared with those of the outermost section 19, which leads to the attractive strength characteristics mentioned before. Due to the double ball bearings on each sloping wall 23 or 24, a favourable load transmission is obtained between neighbouring walls, in that the ball bearings are mainly loaded in a plane perpendicular to these walls. Also these ball bearings ensure a very smooth operation of the telescoping parts during collapsing or extending of the support arm.

FIG. 5 is similar to FIG. 4 but shows a third embodiment, of triangular cross section.

I claim:

1. Supporting arm provided with telescoping members which cooperate by means of roller bearings for supporting a load in an essentially horizontally displaceable manner, wherein the telescoping members consist of sections with a closed polygonal cross section, and all roller bearing races are internal or external section faces with a generally planar surface.

2. Supporting arm according to claim 1, wherein more than two telescoping members are provided, whereby both external as well as internal section faces of any telescoping member other than the outermost and the innermost telescoping member are roller bearing races.

3. Supporting arm according to claim 1, wherein the section faces forming roller bearing races are provided with longitudinal bearing grooves which are formed to receive the bearings, such that the bearings are not displaceable transverse to the supporting arm.

4. Supporting arm according to claim 1, wherein the bearings are needle bearings and the sections consist of walls which in circumferential direction run at an angle in the same direction with respect to each other.

5. Supporting arm according to claim 3, wherein the bearings are ball bearings, and the section faces forming roller bearing races are provided with grooves which in cross section are partly circular.

6. Supporting arm according to claim 5, wherein in each section face forming a roller bearing race at least two parallel grooves are provided, such that the pairs of such section faces enclose at least two parallel series of balls.

7. Supporting arm according to claim 1, wherein each section has internally and/or externally three section faces forming roller bearing races.

8. Supporting arm according to claim 1, wherein each section internally and/or externally has four section faces forming roller bearing races.

9. Supporting arm according to claim 1, wherein the sections have an octagonal cross section, and in circumferential direction consist of alternately walls with and walls without a section face forming roller bearing races, whereby opposing walls without such section face are parallel to each other in pairs.

10. Supporting arm according to claim 9, wherein the opposite pairs of walls with a section face forming a roller bearing race are parallel to each other.

11. Supporting arm according to claim 9, wherein one pair of walls without section faces forming a roller bearing race is disposed horizontally and one pair is disposed vertically.

12. Supporting arm according to claim 10, wherein the section with the smallest cross sectional surface in circumferential direction consists of alternately two walls with and one wall without section faces forming a roller bearing race, and the pair of opposing walls without such section face extends vertically.

13. Supporting arm according to claim 11, wherein the section with the smallest cross sectional surface in circumferential direction consists of alternately two walls with and one wall without section faces forming a roller bearing race, and the pair of opposing walls without such section face extends vertically.

14. Supporting arm according to claim 1, wherein the outermost section is externally provided with a longitudinal groove with undercut cross section for receiving a T-shaped fixing member.

15. Supporting arm according to claim 1, provided with more than two sections, wherein the section with the smallest cross sectional surface is lockable with respect to the next surrounding section when completely collapsed therein.

* * * * *